United States Patent
Pyles et al.

(10) Patent No.: US 8,488,505 B2
(45) Date of Patent: Jul. 16, 2013

(54) METHOD/SYSTEM FOR CONSERVING RESOURCES DURING CONVERSATION OVER WIRELESS NETWORK TRANSPORT MEDIA

(75) Inventors: Andrew J. Pyles, Williamsburg, VA (US); Gang Zhou, Williamsburg, VA (US); Zhen Ren, Williamsburg, VA (US)

(73) Assignee: College of William and Mary, Williamsburg, VA (US)

( * ) Notice: Subject to any disclaimer, the term of this patent is extended or adjusted under 35 U.S.C. 154(b) by 268 days.

(21) Appl. No.: 13/019,793

(22) Filed: Feb. 2, 2011

(65) Prior Publication Data

US 2012/0195242 A1   Aug. 2, 2012

(51) Int. Cl.
*H04W 52/02* (2009.01)
*H04W 72/04* (2009.01)
*H04W 40/00* (2009.01)
*H04B 7/185* (2006.01)
*H04B 7/00* (2006.01)
*H04B 1/38* (2006.01)
*H04B 1/16* (2006.01)

(52) U.S. Cl.
USPC ......... 370/311; 370/310; 370/328; 455/13.4; 455/522; 455/574; 455/343.4

(58) Field of Classification Search
USPC ............... 370/310–311, 328; 455/13.4, 522, 455/574, 343.1–343.6; 340/7.32–7.38
See application file for complete search history.

(56) References Cited

U.S. PATENT DOCUMENTS

| | | | |
|---|---|---|---|
| 6,711,546 B1 * | 3/2004 | Thomas | 704/500 |
| 2003/0210658 A1 * | 11/2003 | Hernandez et al. | 370/311 |
| 2004/0145775 A1 * | 7/2004 | Kubler et al. | 358/1.15 |
| 2005/0013266 A1 * | 1/2005 | Kubler et al. | 370/328 |
| 2005/0020322 A1 * | 1/2005 | Ruuska et al. | 455/574 |
| 2008/0025378 A1 * | 1/2008 | Mahany et al. | 375/150 |
| 2009/0017879 A1 * | 1/2009 | Tsfaty et al. | 455/574 |
| 2010/0290643 A1 * | 11/2010 | Mihelich et al. | 381/99 |
| 2011/0007657 A1 * | 1/2011 | Kazmi et al. | 370/252 |
| 2012/0057513 A1 * | 3/2012 | Kong et al. | 370/311 |
| 2012/0083303 A1 * | 4/2012 | Min et al. | 455/502 |
| 2012/0113878 A1 * | 5/2012 | Yu et al. | 370/311 |
| 2012/0120858 A1 * | 5/2012 | Das et al. | 370/311 |
| 2012/0135779 A1 * | 5/2012 | Kundargi et al. | 455/522 |
| 2012/0269106 A1 * | 10/2012 | Tanach | 370/311 |
| 2012/0287790 A1 * | 11/2012 | Huang et al. | 370/236 |

* cited by examiner

*Primary Examiner* — Asad Nawaz
*Assistant Examiner* — Wutchung Chu
(74) *Attorney, Agent, or Firm* — Jason P. McDevitt

(57) ABSTRACT

A method and system are provided for conserving network resources such as battery power of a battery-powered communication device used to support a conversation over a wireless network transport media. Periods of silence are detected during conversation taking place on a network having controllable resources such as battery power. Using the periods of silence so-detected, future silence periods occurring on the network are then predicted. Allocation of at least a portion of the controllable resources is controlled based on the future silence periods so-predicted.

17 Claims, 1 Drawing Sheet

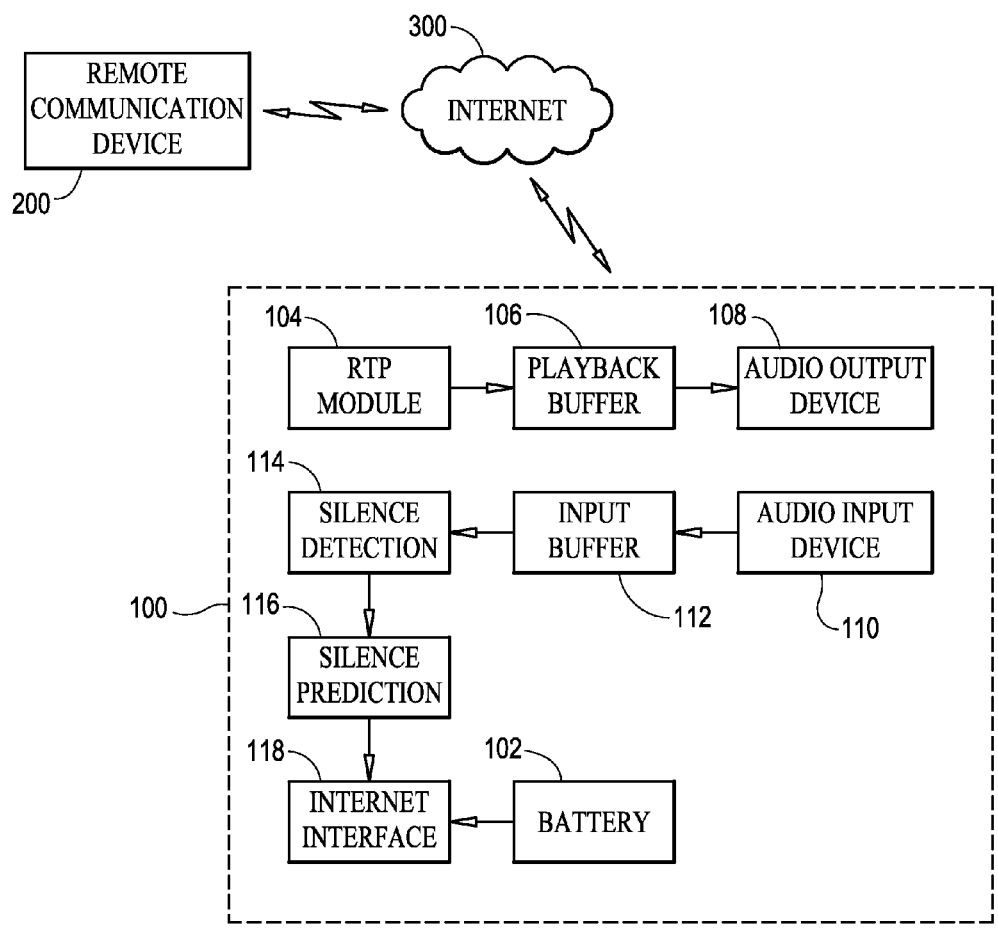

METHOD/SYSTEM FOR CONSERVING RESOURCES DURING CONVERSATION OVER WIRELESS NETWORK TRANSPORT MEDIA

CROSS-REFERENCE TO RELATED APPLICATIONS

Not applicable.

STATEMENT REGARDING FEDERALLY SPONSORED RESEARCH AND DEVELOPMENT

Not applicable.

FIELD OF INVENTION

The field of the invention relates generally to network resource conservation methods and systems, and more particularly to a method and system for conserving a resource such as battery power used by a communication device during conversations carried on over wireless network transport media.

BACKGROUND OF THE INVENTION

Many of today's two-party or multiple-party conversations are accomplished using some sort of wireless communication system such as the cellular data network or a wireless network transport media (e.g., WiFi, 2 G, 3 G, 4 G, etc.). In either case, a battery powered communication device (e.g., cell phone, smart phone, laptop computer, etc.) is typically used to access the wireless communication system. In terms of battery power requirements, communication devices use less battery power when accessing the cellular data network than when accessing one of the wireless network transport media. However, wireless network transport media provide (i) faster data transfer rates than the cellular data network, (ii) lower costs of usage since the airtime charges associated with the cellular data network do not typically apply, and (iii) lower latency compared to the cellular data network. Balancing these pros and cons of the cellular data network versus a wireless network transport media, more and more users of wireless communication device users are electing to use a wireless network transport media to carry on a wireless conversation.

The vast majority of battery-powered communication devices using a wireless network transport media can be classified as smart phones. As much as one-third of a smart phone's battery energy is consumed by its interface that accesses a wireless network transport media. That is, when this interface is "on" (i.e., fully powered in the case of 2 G/3 G/4 G) or "awake" (i.e., powered to support the device's Constantly Awake Mode (CAM) in the case of WiFi), the power requirements are substantially greater than when this interface is "off" (i.e., no power in the case of 2 G/3 G/4 G) or "asleep" (i.e., minimally powered to support the device's Power Save Mode (PSM) in the case of WiFi). Accordingly, it is important to "power" this interface only when necessary to conserve battery power for the communication device.

Studies have shown that periods of silence (i.e., no conversation audio from any party) comprise up to 60% of a typical human conversation. If a smart phone is "on" or in CAM during these periods of silence, the phone's interface is wasting battery power since data "blanks" are being sent/received over the wireless network transport media. It is clear that substantial battery power savings could be achieved if a smart phone's wireless network transport media interface was "off" or in PSM during most or all of the periods of silence. In the current state-of-the-art, most smart phones use a technique referred to as "adaptive PSM" to attempt to exploit the periods of silence in a conversation to save battery power. Briefly, adaptive PSM saves battery power by defaulting the smart phone to PSM and switching to CAM when traffic is observed on the wireless local area network (WLAN) being accessed. One drawback of adaptive PSM is that the transition time delay associated with mode switching (i.e., approximately 1.5 seconds) negatively impacts phone performance when periods of silence are small or when traffic arrives in clumps or bursts. A detailed description of adaptive PSM is presented by E. Rozner et al. in "Network-Assisted Power Management for WiFi Devices," The Annual International Conference on Mobile Systems, Applications, and Services, 2010.

BRIEF SUMMARY OF THE INVENTION

Accordingly, it is an object of the present invention to provide a battery-powered communication device with a method and system for conserving battery power when the communication device is used to support a conversation over a wireless network transport media.

Another object of the present invention is to provide a method and system for exploiting periods of silence in a conversation to conserve battery power for a battery-powered communication device.

In accordance with the present invention, a method and system are provided for conserving network resources such as battery power of a battery-powered communication device used to support a conversation over a wireless network transport media. Periods of silence are detected during at least a portion of at least one conversation taking place on a network having controllable resources such as battery power. Using the periods of silence so-detected, future silence periods occurring on the network are then predicted. Allocation of at least a portion of the controllable resources is controlled based on the future silence periods so-predicted.

BRIEF DESCRIPTION OF THE DRAWINGS

The summary above, and the following detailed description, will be better understood in view of the drawings that depict details of preferred embodiments.

The sole FIGURE is a top-level block diagram of an architecture used in implementing silence prediction-based battery power conservation in accordance with an embodiment of the present invention.

DETAILED DESCRIPTION OF THE INVENTION

The present invention is a novel approach to conserving network resources when that network could be transmitting periods of "silence" or no data. In one embodiment of the present invention, conserving network resources means saving battery power for a battery-powered communication device supporting a conversation over a wireless network transport media. In this embodiment, the communications device becomes part of a network during a conversation. However, as will be explained later herein, the present invention could be used for other network resource conservation applications.

Before describing an exemplary embodiment of the present invention, it will be useful to describe and define the terms "communication device," "conversation" and "wireless network transport media", as they will be referred to herein in order to illustrate the scope of the present invention. The term "communication device" refers to any phone, smart phone, personal computer, laptop computer, video game console, or other device that can connect to the internet using a wireless network transport media and support a human conversation thereover. The term "wireless network transport media" refers to any of a range of technologies that can provide a communication device with access to the internet in a wireless fashion so that a conversation can be supported thereover. Examples of well-known wireless network media include those based on the Institute of Electrical and Electronic Engineers (IEEE) 802.11 standards (more commonly referred to by the trademark "WiFi" or derivative terms thereof). Other examples of wireless network transport media include the multiple generations (i.e., "2 G," "3 G," "4 G," etc.) based on the standards/specifications set forth by the International Telecommunications Union in the International Mobile Telecommunications (IMT)-2000 (or IMT-2000 as it is known).

In the present invention, a communication device's battery power is conserved or saved during periods of silence that occur during the course of human conversation. These periods of silence are periods of mutual silence, i.e., no words/sounds are being spoken/made by any party to the conversation. They can occur during the course of one person's sentence/thought, or can occur as one person waits for a response from another person. A period of silence as referred to herein can be some minimal silence period predicated on the responsiveness of the network medium (e.g., WiFi response time to switch between its Power Save Mode (PSM) and Constantly Awake Mode (CAM) is on the order of milliseconds but future technologies may provide faster response times on the order of microseconds). A period of silence as referred to herein can also last for several seconds or more.

As mentioned previously herein, periods of silence (or silence periods) occupy up to 60% or more of the time between the beginning and end of a typical human conversation. The present invention exploits this condition to save battery power during such silence periods while maintaining the integrity of the conversation. Battery power savings are achieved by placing a communication device in a low power state during much or most of a conversation's silence periods. A low power state is defined as a communication device's state of lower energy requirements (e.g., power needed to keep the device's wireless network transport media's interface inactive or asleep) as compared to the device's state of higher energy requirements (e.g., power needed to keep the device's wireless network transport media's interface actively communicating with the internet). The specifics of a communication device's low/high power states can vary without departing from the scope of the present invention. For example, in WiFi-enabled devices, the low power state uses a small amount of battery power and is referred to as the Power Save Mode (PSM), and the high power state is referred to as the Constantly Awake Mode (CAM). In 2 G/3 G/4 G-enabled devices, the low power state uses approximately zero battery power and the high power state uses some greater amount of battery power.

A description of the present invention provided herein will be referenced to conversation "data" that is digitized/packetized at a sender's device and then re-assembled at a receiver's device. As is known in the art, real-time protocol (RTP) packets are usually sent/transmitted at evenly-spaced intervals decided upon by the communication devices used to carry on a conversation. During silence periods, an RTP packet is completely empty, i.e., no meaningful data contained therein. While this type of digitized/packetized conversation data transmission scheme is used in such ubiquitous schemes as "voice over internet protocol" (VoIP), the present invention is not limited to use therewith. For example, the present invention could also be used with digital cellular networks such as GSM, TDMA and CDMA. Further, when a conversation is transmitted between a mobile station and a base substation, it may also be possible to place the radio into a low power state during silence periods.

Referring now to the sole FIGURE, an architecture used in the implementation of silence prediction-based battery power conservation in accordance with an embodiment of the present invention is illustrated. In the illustrated embodiment, two communication devices 100 and 200 are used to carry on a conversation over the internet 300. Communication device 100 is illustrated with the modules/components associated with the present invention as well as those relevant to the description of the present invention. Communication device 200 can be, but need not be, equipped similar to communication device 100. Accordingly, only the details of device 100 will be described herein to provide an understanding of the present invention. Communication device 200 is assumed to be remotely-located with respect to device 100 where the term "remote" is understood to include very short distances (on the order of feet) to very large distances (on the order of hundreds to thousands of miles). It is further assumed that one party/person will use device 100 to converse with another party/person using device 200. Thus, the illustrated embodiment supports a two-party conversation. However, it is to be understood that the approach described herein applies equally as well to multiple-party conversations using additional communication devices or multiple parties sharing a communication device.

Communication device 100 includes a battery 102 used to supply power to the various components of device 100 as would be understood in the art. Therefore, for clarity of illustration, power supply "lines" coupling battery 102 to the various components of device 100 have been omitted. Further, the type of battery 102 used by device 100 is not a limitation of the present invention.

In the illustrated embodiment, it is assumed that device 100 sends and receives packets of digitized conversation "data" in accordance with real-time protocol (RTP) standards. Accordingly, device 100 includes an RTP module 104 that receives RTP packets over internet 300 and sends RTP packets to internet 300. For conversation reception, RTP module 104 reassembles the packets in a playback buffer 106 which, in turn, provides the re-assembled packets as digital or analog signal to an audio output device 108 (e.g., a speaker). For conversation transmission, an audio input device 110 (e.g., a microphone) is coupled to a buffer 112 where conversation data is digitized prior to processing by the present invention. Such digitization of conversation is well understood in the art.

The present invention introduces two new modules/components 114 and 116 to device 100 in order to carry out a novel method of conserving battery power for device 100. Silence detection module 114 and silence prediction module 116 can be separate modules/components or can be incorporated into a single module/component (e.g., controller, processor, etc.) without departing from the scope of the present invention. These modules "listen" to the conversation passing through RTP module 104 in order to control the power state of battery 102. Very generally, these modules cooperate to predict the duration of future silence periods based on previous conversation history and a conditional probability function. The predictions are then used to place the device's internet interface 118 (e.g., WiFi driver in WiFi-enabled devices, the cellular radio in 2 G/3 G/4 G enabled devices) in its low power state (e.g., PSM for WiFi-enabled devices, "off" for 2 G/3 G/4

G-enabled devices) during the predicted future silence periods where little or no power is required from battery 102.

The method implemented by modules 114 and 116 includes a training time operation and a run-time operation. Since a user of device 100 will have a unique but generally patterned style of conversation, the present invention includes a training time for collecting data indicative of the user's unique speech style. In the present invention, a training time can span a portion of a single conversation, an entire single conversation, the entirety of multiple conversations, etc., without departing from the scope of the present invention. Accordingly, the present invention could employ a single training session the very first time device 100 is used, could employ multiple training sessions over several conversations, or could employ a training session each time device 100 initiates a conversation.

Regardless of the number or length of training times, the approach used by the present invention is always the same. That is, during training, silence detection 114 detects silence periods (i.e., periods of mutual silence) occurring during a conversation over internet 300 using device 100. Since a goal of the present invention is to conserve battery power, it is desired to use a simple silence detection scheme having low processing/power costs associated therewith. By way of example for the RTP packet embodiment, one approach is to look for RTP packets that contain no meaningful data as indications of, for example, short silence periods between two consecutive words in a sentence or a pause in a conversation. A simple approach to such RTP packet detection is to examine the amplitude of the audio stream in the RTP packets. More specifically, the average audio level of the digital samples of an RTP packet is compared to a preset threshold that is indicative of conversation silence. When the average audio level is below this threshold, the RTP packet is classified as silence. Such threshold determination and setting could be determined in a variety of ways and could take the sensitivity of device 100 into consideration as would be well understood in the art. Once the training time is complete, the present invention enters its run-time phase of operation where the length of future silence periods is predicted by silence prediction module 116 using the above-described and so-called training silence periods.

The run-time phase occurs immediately following the training time phase in a seamless fashion. For example, if training time is to occur just one time during the beginning of a single conversation or each time a conversation starts, silence prediction 116 begins as soon as the pre-determined training time ends. Further, if training is to only occur one time (or some preset number of times), the training operation will be bypassed during conversations as silence prediction 116 makes use of the training silence periods from the earlier-completed training time(s).

During run-time operation, silence detection 114 observes when a so-called current silence period begins and silence prediction 116 predicts how long it will last. This prediction is then used by internet interface 118 to place battery 102 in its low power state for the predicted length of time. Since the prediction is predicated on training information specific to the user of device 100, battery power is conserved in accordance with the speaking tendencies of the user. All of this takes place without requiring any user input or specific user operation.

Silence prediction 116 uses the training silence periods from silence detection 114 to construct an empirical cumulative distribution function (ECDF). The ECDF will be unique based on the training data. Construction of an ECDF is well known in the art. See, for example, D. R. Cox et al., "Analysis of Survival Data," Chapman & Hall, London, 1984. The constructed EDCF is first used by silence prediction 116 to determine what will be referred to herein as a computed training silence length of time that is based upon the silence periods collected during training as will be explained in greater detail later herein.

During run-time operation, silence detection 114 "listens" to the conversation (e.g., the portion of the conversation commencing at the conclusion of training, some future conversation when training is not employed, etc.) to determine when a current silence period has occurred. Detection of a current silence period can follow the same scheme used during training or a different scheme without departing from the scope of the present invention.

Once a current silence period has been detected, silence prediction 116 employs a conditional probability scheme to predict how long this current silence period will last. More specifically, prediction in the present invention uses the ECDF to look for an appropriate incremental silence length $\Delta$ that has a conditional probability $P(X>\alpha+\Delta|X>\alpha)$ larger than or equal to a threshold probability defined herein as $\beta$, where X denotes the length of the current silence period and a $\alpha$ is the above-referenced computed training silence length of time that is initially generated from the ECDF. If an incremental silence length $\Delta$ can be found that satisfies this conditional probability, then the current silence period is predicted to be equal to $(\alpha+\Delta)$. The value of $\alpha$ will also be updated in accordance with $(\alpha+\Delta)$ to prepare for a possible consecutive prediction. For maximum battery conservation, the search for a $\Delta$ that satisfies the conditional probability can be repeated in an effort to maximize $\Delta$, thereby maximizing the predicted length of the current silence period. If an incremental silence length $\Delta$ cannot be found to satisfy this conditional probability, $\Delta$ is set equal to zero such that the current silence period length prediction of $(\alpha+\Delta)$ is essentially the training silence length of time $\alpha$. Silence prediction 116 then supplies the predicted length of time to internet interface 118 for governance of the low power state of battery 102 as described above. The prediction scheme continues until the current silence period ends (as detected by silence detection 114) or until no $\Delta$ can be found to satisfy the conditional probability. The prediction scheme is repeated if the current silence period is still detected at the end of the predicted length of time. If the current silence period is no longer detected at the end of the predicted length of time, battery 102 is restored to its high power state and silence prediction 116 awaits detection of the next current silence period.

While the threshold probability $\beta$ can generally range from 0 to 1, a variety of test cases of the present invention have shown that good performance (i.e., battery power conservation) is achieved when the threshold probability $\beta$ ranges from approximately 0.25 to approximately 0.7. Larger values of incremental silence length $\Delta$ are achieved for lower values of $\beta$. This results in the greatest battery power savings. However, this also increases the risk of errors which can degrade the quality of a phone conversation. Large values of $\beta$ improve the conversation quality, but conserve less battery power. Accordingly, the present invention could provide the user with a "call quality/battery conservation" input that would allow the user to essentially select an operational value of $\beta$ to suit the user's preference. For example, when a user experiences degradation in conversation quality (e.g., obvious delay and jitter), conversation quality could be improved by the user selecting "call quality" to thereby implement a larger $\beta$ value. However, when the user wants/needs to save more battery power, the user could select "battery conservation" to thereby implement a lower $\beta$ value.

Initially, the computed training silence length of time α is determined to be the minimum α value that satisfies the condition $P(X>\alpha+K|X>\alpha) \geq \beta$. Here, the value of β is set as discussed above. Thus, with a given β value, the minimal α value is determined for which silence prediction 116 is able to predict a silence period that is at least K seconds long. The value of K can be selected to suit a particular application. For example, in the case of VoIP using RTP packets, K could be 20 milliseconds because this is the time it takes for VoIP to generate one RTP packet.

The advantages of the present invention are numerous. Silence period prediction in a phone conversation is used to conserve battery power without negatively impacting call quality. In tests of the present invention using various types of training data and a variety of threshold probability values, the present invention achieved energy savings of 40% or more during a phone conversation. This will extend the life of a battery charge for users of a variety of communication devices using the internet to support conversations.

As mentioned above, the present invention can be extended to other network resource conservation applications. For example, the owner of a packet switching network or circuit switching network could also take advantage of the above-described future silence prediction. In packet switching, a VoIP application running through a Multi-Protocol Label Switching (MPLS) virtual link could take advantage of the silence prediction by freeing up resources during the silence periods for other purposes by, for instance, not tagging silence packets or setting the silence packets to a lower priority in terms of resource allocation. If the network provider sees significant VoIP traffic, the amount of network resources saved (or made available for other functions) during this period could be significant since roughly 60% of voice traffic can be classified as silence. For a circuit switched network with dedicated voice trunks, resources could be saved by silence prediction in the following manner. During predicted silence periods, the voice trunks could be used for other purposes for short "bursty" traffic. For instance, a voice circuit could be reassigned to send "short message service" (SMS) traffic during a silence period that is long enough.

INCORPORATION BY REFERENCE

All publications, patents, and patent applications cited herein are hereby expressly incorporated by reference in their entirety and for all purposes to the same extent as if each was so individually denoted.

EQUIVALENTS

While specific embodiments of the subject invention have been discussed, the above specification is illustrative and not restrictive. Many variations of the invention will become apparent to those skilled in the art upon review of this specification. Thus, the full scope of the invention should be determined by reference to the claims, along with their full scope of equivalents, and the specification, along with such variations.

We claim:

1. A method of conserving battery power when using a battery-powered communication device to support a conversation over a wireless network transport media, comprising the steps of:

providing a battery-powered communication device capable of supporting a conversation over a wireless network transport media, the communication device having a high power state (HPS) of operation and a low power state (LPS) of operation wherein battery power required for said LPS is less than battery power required for said HPS;

detecting periods of silence during at least a portion of at least one conversation supported by the communication device;

predicting, using said periods of silence so-detected, future silence periods occurring during at least one of (i) a remainder of said at least one conversation, and (ii) a future conversation supported by the communication device; and placing the communication device in said LPS during each of said future silence periods so-predicted;

wherein said step of predicting comprises the steps of:

generating an empirical cumulative distribution function (ECDF) using said periods of silence so-detected;

generating a computed training silence length of time α using said ECDF;

detecting a current silence period occurring during one of (i) said remainder of said at least one conversation, and (ii) said future conversation; and determining, using said ECDF, a conditional probability that said current silence period will last an additional length of time Δ beyond said computed training silence length of time α, wherein one of said future silence periods is defined by (α+Δ) when said conditional probability is greater than or equal to a threshold probability β.

2. A method according to claim 1, wherein said threshold probability β is in the range of approximately 0.25 to approximately 0.7.

3. A method according to claim 1 wherein, when said conditional probability is greater than or equal to said threshold probability β, said step of determining is repeated until said additional length of time Δ is maximized.

4. A method according to claim 1 wherein, when said conditional probability is less than said threshold probability β, said method further comprises the step of setting said one of said future silence periods equal to said computed training silence length of time α.

5. A method of conserving battery power when using a battery-powered communication device to support a conversation over a wireless network transport media, comprising the steps of:

providing a battery-powered communication device capable of supporting a conversation over a wireless network transport media, the communication device having a high power state (HPS) of operation and a low power state (LPS) of operation wherein battery power required for said LPS is less than battery power required for said HPS;

selecting a threshold audio level;

comparing said threshold audio level to an average audio level of a portion of digitized samples associated with a portion of at least one conversation supported by the communication device, wherein periods of silence are indicated each time said average audio level is less than said threshold audio level;

generating an empirical cumulative distribution function (ECDF) using said periods of silence so-indicated during said step of comparing;

generating a computed training silence length of time α using said ECDF;

detecting a silence period occurring during one of (i) a remainder of said at least one conversation, and (ii) a future conversation supported by the communication device;

determining, using said ECDF, a conditional probability that said silence period will last an additional length of time $\Delta$ beyond said computed training silence length of time $\alpha$, wherein a length of a future silence period is defined by $(\alpha+\Delta)$ when said conditional probability is greater than or equal to a threshold probability $\beta$; and placing the communication device in said LPS during each of said future silence periods so-defined during said step of determining.

6. A method according to claim 5, wherein the conversation is packetized.

7. A method according to claim 5, wherein said threshold probability $\beta$ is in the range of approximately 0.25 to approximately 0.7.

8. A method according to claim 5 wherein, when said conditional probability is greater than or equal to said threshold probability $\beta$, said step of determining is repeated until said additional length of time $\Delta$ is maximized.

9. A method according to claim 5 wherein, when said conditional probability is less than said threshold probability $\beta$, said method further comprises the step of setting said one of said future silence periods equal to said computed training silence length of time $\alpha$.

10. A system for conserving battery power in a battery-powered communication device that supports a conversation over a wireless network transport media, comprising a controller adapted to be included in a battery-powered communication device capable of supporting a conversation over a wireless network transport media, the communication device having a high power state (HPS) of operation and a low power state (LPS) of operation wherein battery power required for said LPS is less than battery power required for said HPS, said controller detecting periods of silence during at least a portion of at least one conversation supported by the communication device, said controller predicting, using said periods of silence so-detected, future silence periods occurring during at least one of (i) a remainder of said at least one conversation, and (ii) a future conversation supported by the communication device, and said controller placing the communication device in said LPS during each of said future silence periods so-predicted;

wherein said controller predicts said future silence periods by generating an empirical cumulative distribution function (ECDF) using said periods of silence so-detected, generating a computed training silence length of time a using said ECDF;

detecting a current silence period occurring during one of (i) said remainder of said at least one conversation, and (ii) said future conversation; and determining, using said ECDF, a conditional probability that said current silence period will last an additional length of time $\Delta$ beyond said computed training silence length of time $\alpha$, wherein one of said future silence periods is defined by $(\alpha+\Delta)$ when said conditional probability is greater than or equal to a threshold probability $\beta$.

11. A system as in claim 10, wherein said threshold probability $\beta$ is in the range of approximately 0.25 to approximately 0.7.

12. A system as in claim 10 wherein, when said conditional probability is greater than or equal to said threshold probability $\beta$, said controller continues determining said conditional probability until said additional length of time $\Delta$ is maximized.

13. A system as in claim 10 wherein, when said conditional probability is less than said threshold probability $\beta$, said controller sets said one of said future silence periods equal to said computed training silence length of time $\alpha$.

14. A method of conserving network resources, comprising the steps of:

detecting periods of silence during at least a portion of at least one conversation adapted to take place on a network having controllable resources;

predicting, using said periods of silence so-detected, future silence periods occurring on the network; and controlling allocation of at least a portion of the controllable resources based on said future silence periods;

wherein said step of predicting comprises the steps of:

generating an empirical cumulative distribution function (ECDF) using said periods of silence so-detected;

generating a computed training silence length of time a using said ECDF;

detecting a current silence period occurring on the network; and determining, using said ECDF, a conditional probability that said current silence period will last an additional length of time $\Delta$ beyond said computed training silence length of time $\alpha$, wherein one of said future silence periods is defined by $(\alpha+\Delta)$ when said conditional probability is greater than or equal to a threshold probability $\beta$.

15. A method according to claim 14, wherein said threshold probability $\beta$ is in the range of approximately 0.25 to approximately 0.7.

16. A method according to claim 14 wherein, when said conditional probability is greater than or equal to said threshold probability $\beta$, said step of determining is repeated until said additional length of time $\Delta$ is maximized.

17. A method according to claim 14 wherein, when said conditional probability is less than said threshold probability $\beta$, said method further comprises the step of setting said one of said future silence periods equal to said computed training silence length of time $\alpha$.

* * * * *